(12) United States Patent
Wieser et al.

(10) Patent No.: US 11,386,620 B2
(45) Date of Patent: Jul. 12, 2022

(54) MULTI-ENDPOINT MIXED-REALITY MEETINGS

(71) Applicant: Microsoft Technology Licensing, LLC, Redmond, WA (US)

(72) Inventors: Anthony Arnold Wieser, Cambridge (GB); Martin Grayson, Bedford (GB); Kenton Paul Anthony O'Hara, Cambridge (GB); Edward Sean Lloyd Rintel, Cambridge (GB); Camilla Alice Longden, Cambridge (GB); Philipp Steinacher, Berlin (DE); Dominic Roedel, Prague (CZ); Advait Sarkar, Cambridge (GB); Shu Sam Chen, Cambridge (GB); Jens Emil Krarup Gronbaek, Cambridge (GB); Ding Wang, Bristol (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 15/984,316

(22) Filed: May 18, 2018

(65) Prior Publication Data

US 2019/0287306 A1 Sep. 19, 2019

(30) Foreign Application Priority Data

Mar. 19, 2018 (GB) ..................... 1804383

(51) Int. Cl.
*G06T 19/00* (2011.01)
*H04N 21/2187* (2011.01)
(Continued)

(52) U.S. Cl.
CPC .......... *G06T 19/006* (2013.01); *G06F 3/1454* (2013.01); *G06T 7/20* (2013.01);
(Continued)

(58) Field of Classification Search
CPC ..... G06F 3/1454; G06T 17/20; G06T 19/006; G06T 19/20; G06T 2207/10016;
(Continued)

(56) References Cited

U.S. PATENT DOCUMENTS 5,606,674 A 2/1997 Root
6,484,156 B1 11/2002 Gupta et al.
(Continued)

FOREIGN PATENT DOCUMENTS

WO 9946702 A1 9/1999

OTHER PUBLICATIONS

Benford, et al., "Understanding and Constructing Shared Spaces with Mixed Reality Boundaries", In Journal of ACM Transactions on Computer-Human Interaction, vol. 5, Issue 3, Sep. 1, 1998, pp. 185-223.
(Continued)

*Primary Examiner* — Ming Wu (57) ABSTRACT

A method of providing a geographically distributed live mixed-reality meeting is described. The method comprises receiving, from a camera at a first endpoint, a live video stream; generating an mixed reality view incorporating the received video stream; rendering the mixed reality view at a display at the first endpoint and transmitting the mixed reality view to at least one other geographically distant endpoint; receiving data defining a bounding area; calculating a real world anchor for the bounding area using the data defining the bounding area; rendering the bounding area in the mixed reality view at a real world position determined using the real world anchor; and applying different rule sets to content objects placed into the mixed reality view by users dependent upon the position of the content objects relative to the bounding area in real world space.

20 Claims, 7 Drawing Sheets

(51) Int. Cl.
G06T 19/20 (2011.01)
G06T 17/20 (2006.01)
G06T 7/70 (2017.01)
G06F 3/14 (2006.01)
H04N 7/15 (2006.01)
G06T 7/20 (2017.01)
H04N 7/14 (2006.01)

(52) U.S. Cl.
CPC ............... *G06T 7/70* (2017.01); *G06T 17/20* (2013.01); *G06T 19/20* (2013.01); *H04N 7/147* (2013.01); *H04N 7/15* (2013.01); *H04N 7/157* (2013.01); *H04N 21/2187* (2013.01); *G06T 2207/10016* (2013.01); *G06T 2210/12* (2013.01); *G06T 2219/024* (2013.01)

(58) Field of Classification Search
CPC . G06T 2210/12; G06T 2219/024; G06T 7/20; G06T 7/70; H04N 21/2187; H04N 7/147; H04N 7/15; H04N 7/157
See application file for complete search history.

(56) References Cited

U.S. PATENT DOCUMENTS

| | | |
|---|---|---|
| 7,010,751 B2 | 3/2006 | Shneiderman |
| 7,149,755 B2 | 12/2006 | Obrador |
| 7,564,469 B2 | 7/2009 | Cohen |
| 8,358,320 B2 | 1/2013 | Zhou et al. |
| 8,566,353 B2 | 10/2013 | Fink et al. |
| 9,043,349 B1 | 5/2015 | Lin et al. |
| 9,274,693 B2 | 3/2016 | Moore et al. |
| 9,280,850 B2 | 3/2016 | Adhikari et al. |
| 9,280,952 B2 | 3/2016 | Ratnakar et al. |
| 9,319,357 B2 | 4/2016 | Moyers |
| 9,384,594 B2 | 7/2016 | Maciocci et al. |
| 9,516,255 B2 | 12/2016 | Lee et al. |
| 9,544,537 B2 | 1/2017 | Reitel et al. |
| 9,554,030 B2 | 1/2017 | Li et al. |
| 9,626,577 B1 | 4/2017 | Yu et al. |
| 9,691,184 B2 | 6/2017 | Blanchflower et al. |
| 9,721,030 B2 | 8/2017 | Parish et al. |
| 2002/0033835 A1* | 3/2002 | Sowizral ............... G06T 15/405 345/645 |
| 2004/0130564 A1* | 7/2004 | Smith ................... G06F 9/451 715/705 |
| 2006/0227151 A1* | 10/2006 | Bannai ................... A63F 13/00 345/633 |
| 2011/0158532 A1 | 6/2011 | Chung et al. |
| 2012/0067954 A1 | 3/2012 | Moganti et al. |
| 2012/0092329 A1 | 4/2012 | Koo et al. |
| 2012/0249416 A1 | 10/2012 | Maciocci et al. |
| 2012/0254858 A1 | 10/2012 | Moyers et al. |
| 2013/0293468 A1 | 11/2013 | Perez et al. |
| 2013/0321390 A1 | 12/2013 | Latta et al. |
| 2014/0247278 A1 | 9/2014 | Samara et al. |
| 2014/0328512 A1* | 11/2014 | Gurwicz ............... G06K 9/6263 382/103 |
| 2014/0347707 A1 | 11/2014 | Lee et al. |
| 2015/0199892 A1* | 7/2015 | Johnson ............ G08B 21/0476 348/77 |
| 2015/0304253 A1 | 10/2015 | Lee et al. |
| 2016/0266386 A1 | 9/2016 | Scott et al. |
| 2016/0358383 A1 | 12/2016 | Gauglitz et al. |
| 2017/0053621 A1* | 2/2017 | Chen ..................... G09G 5/377 |
| 2017/0062016 A1 | 3/2017 | Samra et al. |
| 2019/0205630 A1* | 7/2019 | Kusens .............. G06K 9/00369 |

OTHER PUBLICATIONS

Christina, "How to Add your Campaign URL to your YouTube video", Retrieved from<< https://web.archive.org/web/20140314040255/https:/support.indiegogo.com/hc/en-us/articles/526366-How-To-Add-Your-Campaign-URL-To-Your-YouTube-Video>>, Jul. 4, 2012, 3 Pages.

Fragoso, et al., "TranslatAR: A Mobile Augmented Reality Translator", In Proceedings of IEEE Workshop on Applications of Computer Vision, Jan. 5, 2011, pp. 497-502.

Harper, et al., "What is Computer Vision API Version 1.0", Retrieved from << https://docs.microsoft.com/en-us/azure/cognitive-services/computer-vision/home>>. Aug. 10, 2017, 23 Pages.

Koleva, et al., "Experiencing a Presentation through a Mixed Reality Boundary", In Proceedings of the International ACM SIG-GROUP Conference on Supporting Group Work, Sep. 30, 2001, pp. 71-80.

Müller, et al., "Virtual Objects as Spatial Cues in Collaborative Mixed Reality Environments: How They Shape Communication Behavior and User Task Load", In Proceedings of CHI Conference on Human Factors in Computing Systems, May 7, 2016, pp. 1245-1249.

Reilly, et al., "SecSpace: Prototyping Usable Privacy and Security for Mixed Reality Collaborative Environments", In Proceedings of the ACM SIGCHI Symposium on Engineering Interactive Computing Systems, Jun. 17, 2014, 11 Pages.

Toyama, et al., "A Mixed Reality Head-Mounted Text Translation System Using Eye Gaze Input", In Proceedings of 19th International Conference on Intelligent User Interfaces, Feb. 24, 2014, pp. 329-334.

Kapadia, et al., "Virtual Walls: Protecting Digital Privacy in Pervasive Environments", In Proceedings of the International Conference on Pervasive Computing, May 13, 2007, pp. 162-179.

"International Search Report and Written Opinion Issued in PCT Application No. PCT/US19/021519", dated May 16, 2019, 13 Pages.

First Office Action Issued in European Patent Application No. 19712882.02, dated Mar. 7, 2022, 7 Pages.

* cited by examiner

MULTI-ENDPOINT MIXED-REALITY MEETINGS

BACKGROUND

With the increase in agile working, more meetings involve participants who are in different locations, where these locations may all be physically close to each other (e.g. within the same building) or the locations may be more geographically distributed (e.g. within different towns and/or different countries).

The embodiments described below are not limited to implementations which solve any or all of the disadvantages of known methods of providing live multi-endpoint meetings.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A method of providing a geographically distributed live mixed-reality meeting is described. The method comprises receiving, from a camera at a first endpoint, a live video stream; generating a mixed reality view incorporating the received video stream; rendering the mixed reality view at a display at the first endpoint and transmitting the mixed reality view to at least one other geographically distant endpoint; receiving data defining a bounding area; calculating a real world anchor for the bounding area using the data defining the bounding area; rendering the bounding area in the mixed reality view at a real world position determined using the real world anchor; and applying different rule sets to content objects placed into the mixed reality view by users dependent upon the position of the content objects relative to the bounding area in real world space.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, more meetings involve participants who are in different locations. To provide an effective meeting system, the latency between endpoints (i.e. computing devices from which users can participate in the meeting) must be minimized and be sufficiently small that it is not apparent to the participants. Additionally, asymmetry between physical location and digital connection between endpoints must be bridged so participants may engage with one another in rich ways that limit the relevance of the lack of colocation.

Described herein is a method and system for providing a geographically distributed live mixed-reality meeting, where the term 'geographically distributed' refers to any set of endpoints that are not all in the same place, but includes endpoints within the same building (e.g. in different rooms, at different desks or chairs within the same room, etc.). The term 'endpoint' is used herein to refer to any computing device that runs the mixed-reality meeting client software (which may be referred to as the 'MR client' or 'MR meeting client' in the following description) and thereby enables a user to participate in the mixed-reality meeting. As the meeting is live (i.e. the participants interact in real-time), the mixed-reality views that are rendered and displayed at each of the geographically distributed endpoints need to be synchronized sufficiently that any time differences are not perceivable by the users (who may also be referred to as 'participants') and hence are not relevant to those users in the context of the mixed-reality meeting.

To achieve the synchronization, the system is arranged so that latency between endpoints in the system is reduced. The system described herein may also configured so that so that it does not require specialist hardware at any of the endpoints and hence the mixed-reality meeting may, for example, be implemented on a plurality of mobile phones, tablets or other mobile (e.g. handheld and/or portable) computing devices, each acting as an endpoint of the system. This facilitates agile working by participants. Each endpoint runs client software and this client software may be the same for all endpoints, with a mixed reality service running on a server in communication with one of the endpoints, referred to as the local or focus endpoint, or alternatively the mixed reality service may run on the local endpoint (e.g. as part of the client software at that endpoint or in communication with the client software at that endpoint).

As well as providing a live video stream from the local endpoint at each of the remote endpoints, participants typically want to be able to share content (i.e. digital resources in the form of documents, presentations, spreadsheets, images, etc.) as part of the meeting and/or after the meeting. Currently, users typically share content by emailing the content to all the participants ahead of the meeting or by saving the content to a shared storage area, from which all the participants can access the content. Alternatively, the local endpoint may display content during the meeting (e.g. as part of the live video stream), thereby enabling the participants to discuss the content during the meeting; however, after the meeting ends, the content is no longer shared and the participants must adopt one of the other approaches to share the content (e.g. email or shared storage).

The systems and methods described herein enable the processing of the content and provide control over how the content is processed. The processing of the content may comprise content distribution and/or content modification (or manipulation). This control of the content processing (e.g. content distribution) may be by a user at one of the endpoints or the control may be distributed so that users at some or all of the endpoints can control content processing. This control, as described in detail below and where it relates to content distribution, may relate to who receives access to a particular piece of content and/or what a recipient can do with a piece of content that they are granted access to. In various examples, where the content processing comprises content modification or manipulation, the control may determine what modifications are applied to a particular piece of content (e.g. by changing the colour, form or size of the content or performing any other automated manipulation of the visual artifacts of the content).

Using the methods described herein, content processing is implemented using touch inputs on a touchscreen (e.g. swipe, drag, and tap inputs) and does not require keyboard or mouse input devices (although users may, alternatively, use a keyboard and/or mouse). Using the systems and methods described herein, task and workflow efficiency and creativity, security, ease of operation, and accessibility (e.g. for visually impaired users) of content distribution and/or modification are improved and the functionality of the underlying device is also improved.

Figure 1:
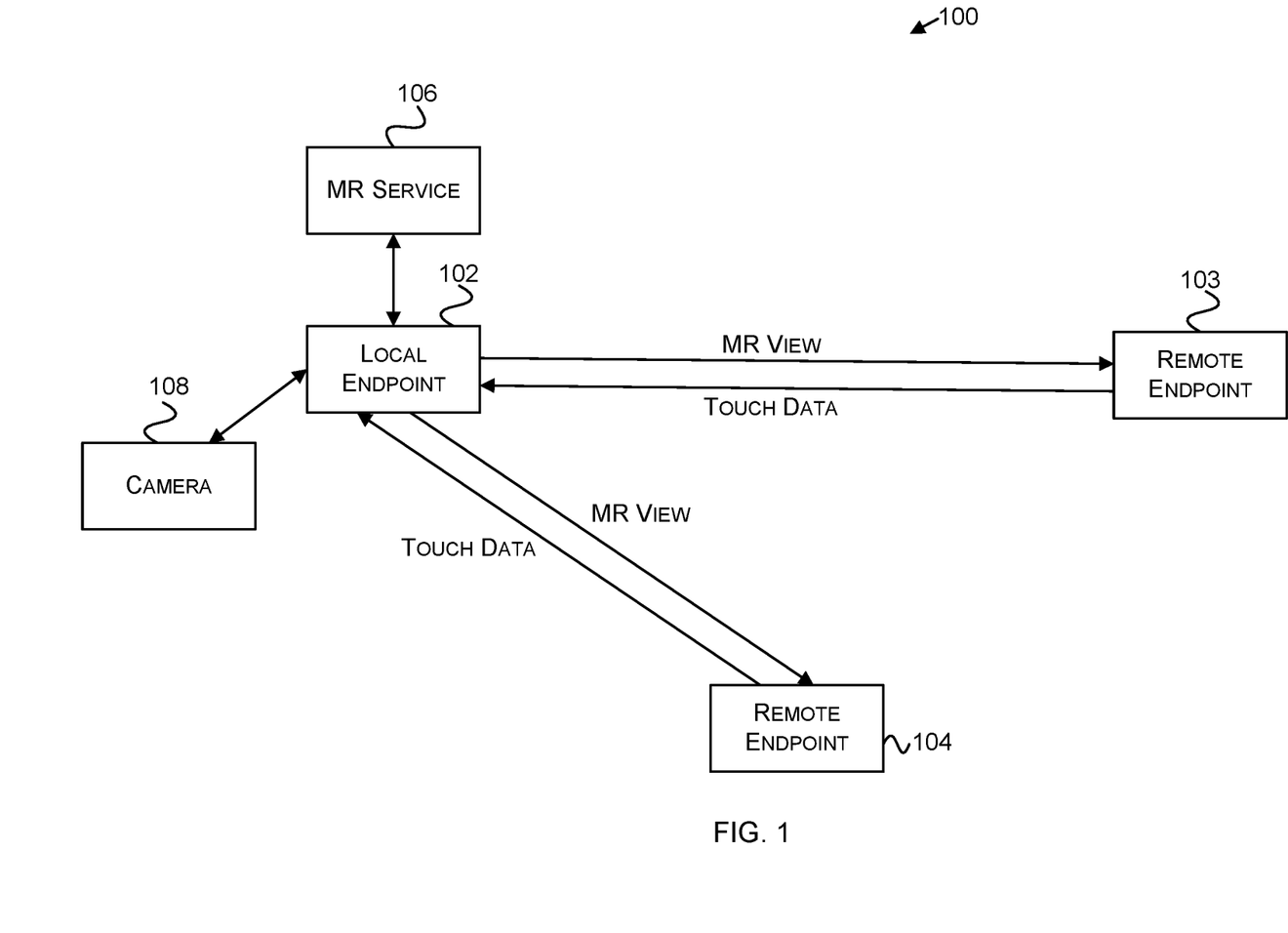
FIG. 1 is a schematic diagram of a system for providing a geographically distributed live mixed-reality meeting.

FIG. 1 is a schematic diagram of a system 100 for providing a geographically distributed live mixed-reality meeting. The system 100 comprises a plurality of geographically distributed endpoints 102-104. These endpoints may, for example, be mobile telephones, tablet computers, laptop computers or other forms of portable computing devices. In other examples, one or more of the endpoints may be a non-portable computing device, such as a desktop computer. One of the endpoints 102, denoted the local endpoint or focus endpoint, has an associated mixed reality (MR) service 106 and camera 108.

In various examples the local endpoint may comprise additional elements not shown in FIG. 1, such as a motion sensor (which may be integral to the camera 108 or separate from the camera 108) and/or an additional depth camera alongside the camera 108. Where the camera 108 is mobile or movable, the local endpoint may, for example, comprise a motion sensor. Data from the motion sensor may be used by the MR service 106 to determine the position of the camera 108 in the room. In examples where the camera 108 is in a fixed position, there may be no motion sensor.

In various examples the local endpoint may comprise more than one camera, such as the camera 108 and an additional depth camera. Provision of a depth camera in addition to the camera 108 (that is configured to capture a live video stream) improves the quality of the tracking performed by the MR service 106.

Figure 2A:
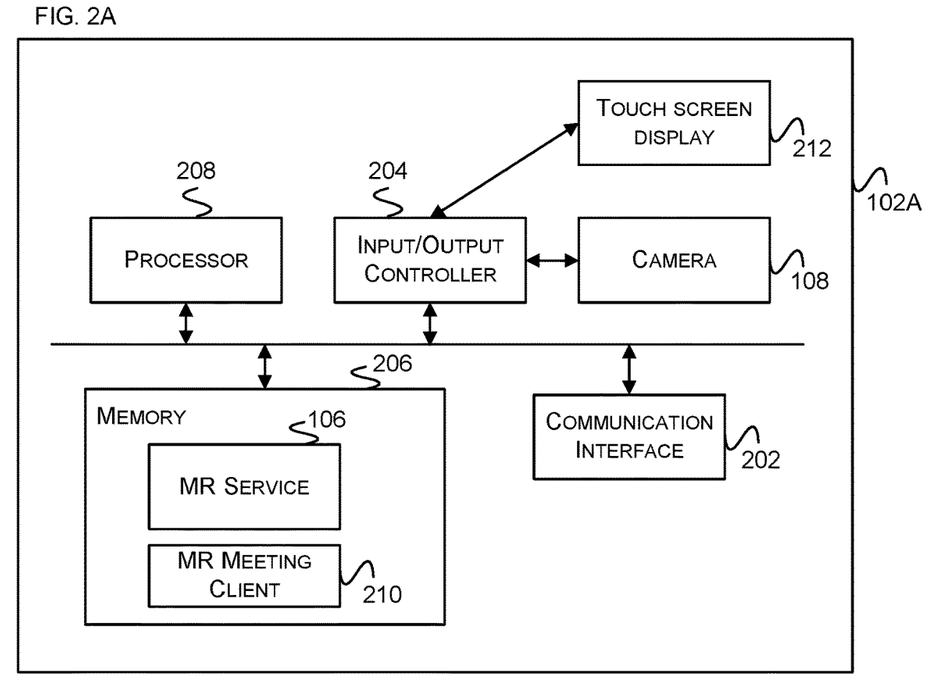
FIGS. 2A-2D are schematic diagrams of different example implementations of a local endpoint from FIG. 1.
Figure 2B:
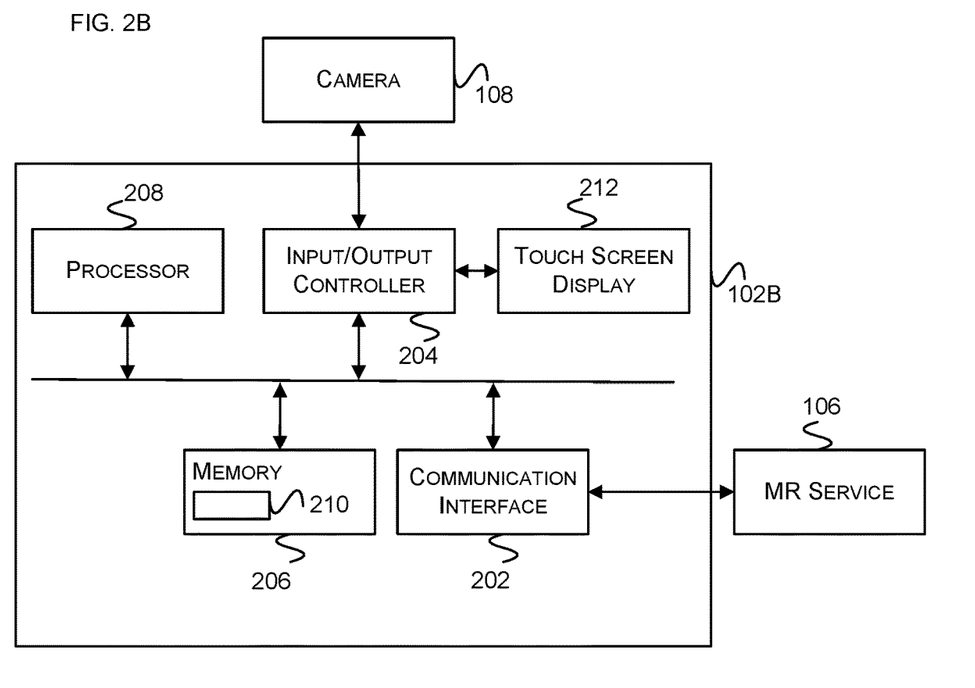

In various examples, as shown in FIG. 2A, the local endpoint 102A may comprise both the MR service 106 and the camera 108 and in various examples, the MR service 106 and MR meeting client 210 may be integrated. In other examples, as shown in FIG. 2B, the local endpoint 102B may comprise neither the MR service 106 nor the camera 108 but may be in communication with both (e.g. via a communication interface 202 and input/output controller 204 respectively). In further examples, as shown in FIGS. 2C and 2D, the local endpoint 102C, 102D may comprise either the MR service 106 or the camera 108.

In examples where the local endpoint 102, 102A, 102D comprises the MR service 106, the MR service 106 may be implemented in software and comprise computer executable instructions stored in memory 206 and executed by a processor 208 within the local endpoint 102A, 102D. In other examples, however, the MR service 106 may run on a separate computing device which may be located in the same place as the local endpoint 102 or may be located on a distant server (e.g. in a data center) and the local endpoint 102 may communicate with the MR service 106 over a network via the communication interface 202.

Figure 2C:
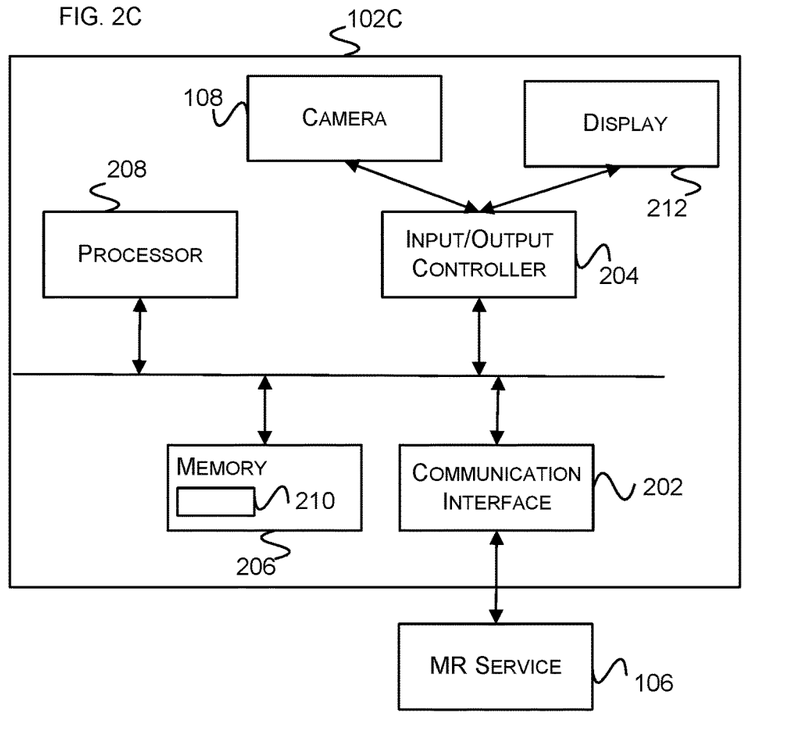
Figure 2D:
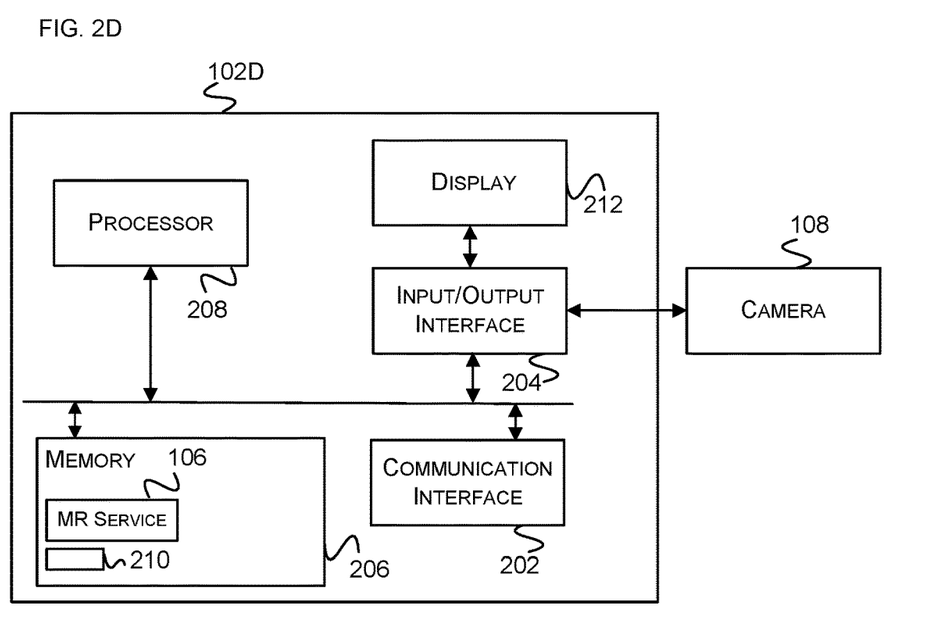

As described above, the camera 108 may be integral to the local endpoint (as shown in FIGS. 2A and 2C), e.g. where the local endpoint is a mobile phone or tablet computer, the camera 108 is the device's integral front or rear facing camera. Such a camera may be moved (e.g. so that it points in another direction) by a user at the local endpoint physically moving the local endpoint. In other examples, where the camera 108 is separate from the local endpoint (as shown in FIGS. 2B and 2D), the local endpoint may communicate with the camera 106 via the input/output interface 204. In such examples, the camera 108 may, for example, be a fixed camera, such as a 360° camera which may be installed in a meeting room. Such a camera may, for example, not be movable such that its field of view is always the same, or may be movable by the user via user input commands made via the MR meeting client 210. In various examples, users at remote end points may also be able to control the camera 108, e.g. by user input commands made via the MR meeting clients 310 at the remote endpoints.

Although all of the examples shown in FIGS. 2A-2D show that the local endpoint 102A-102D comprises a touch-sensitive display (or touch-screen display) 212, in yet further examples, the display 212 may be separate from the local endpoint (e.g. it may be a peripheral device to the local endpoint) and in various examples, a non-touch screen display may be provided along with an alternative user input device instead of a touch-sensitive display.

As shown in FIGS. 2A-2D, the local endpoint 102A-102D further comprises a mixed-reality (MR) meeting client 210 that is implemented in software and comprises computer executable instructions stored in memory 206 and executed by a processor 208 within the local endpoint. The operation of this MR meeting client 210, in combination with the MR service 106, is described below with reference to FIG. 4. The MR meeting client 210 may be a dedicated piece of software or the functionality of the MR meeting client 210 may be integrated within another application.

Figure 3:
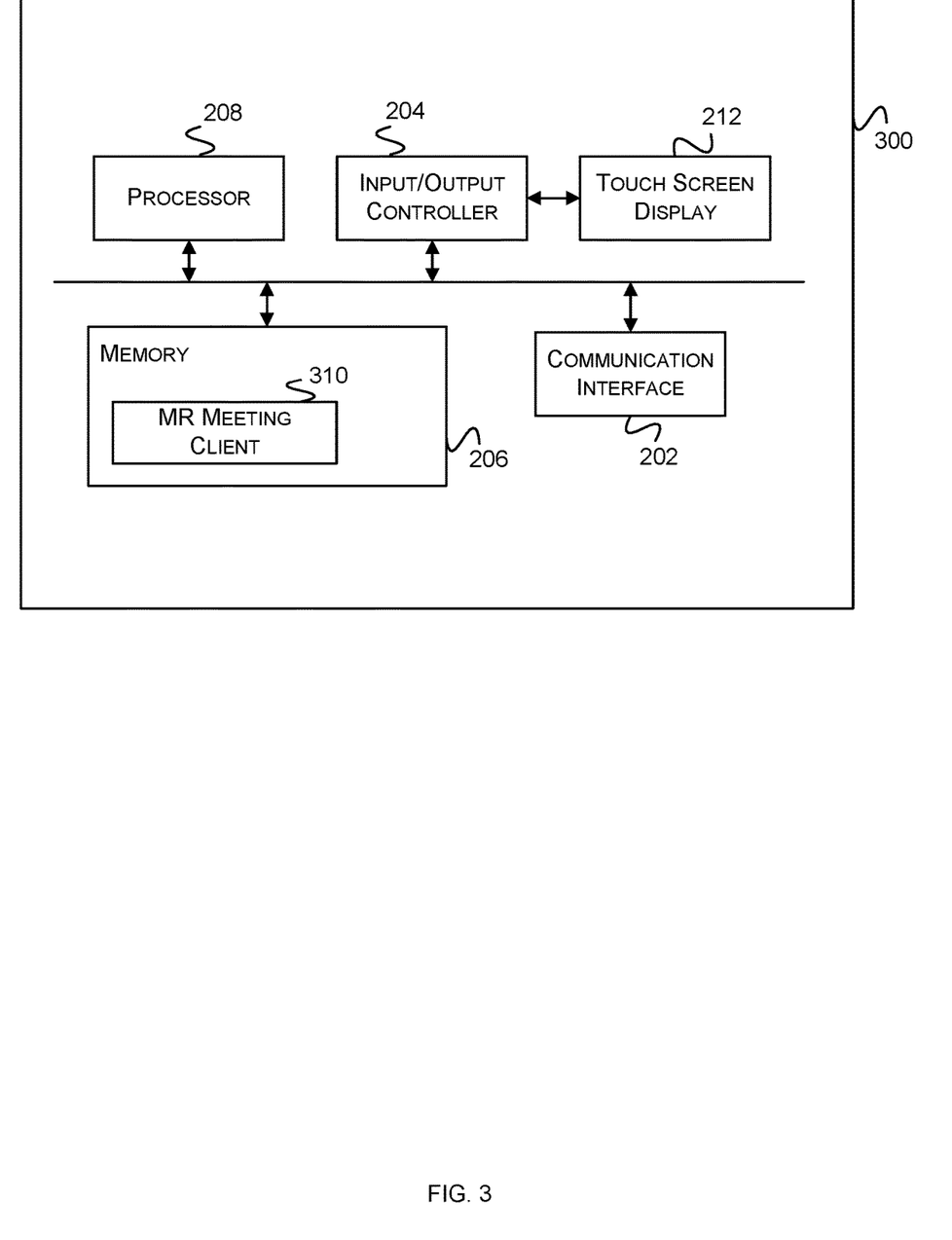
FIG. 3 is a schematic diagram of an example implementation of a remote endpoint from FIG. 1.

In contrast to the local endpoints, the remote endpoints 103, 104 do not need to run, or be associated with, an MR service or have a camera (although they may comprise a camera). The remote endpoints 103, 104 may, for example, be mobile telephones, tablet computers, laptop computers or other forms of portable computing devices (and not specialized MR or MR hardware such as head-mounted displays). As shown in FIG. 3, the remote endpoints 300 may comprise a touch-sensitive display (or touch-screen display) 212, although in various examples, the display 212 may be separate from the remote endpoint (e.g. it may be a peripheral device to the remote endpoint). The remote endpoints 300 comprise a mixed-reality (MR) meeting client 310 that is implemented in software and comprises computer executable instructions stored in memory 206 and executed by a processor 208 within the remote endpoint. The operation of this MR meeting client 310, which is different from the client 210 that runs at the local endpoint, is described below with reference to FIG. 6.

Figure 4:
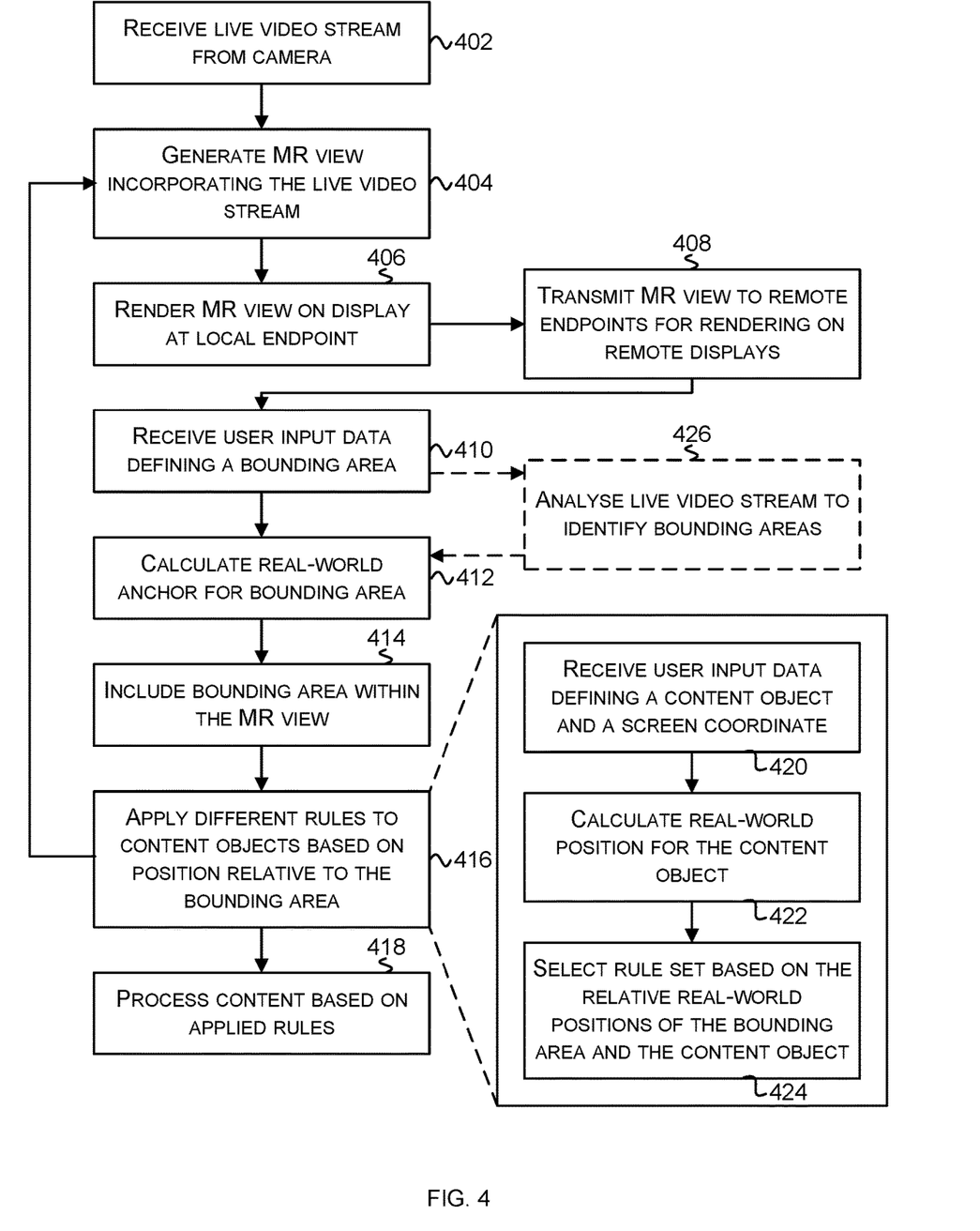
FIG. 4 is a flow diagram of a method for providing a geographically distributed live mixed-reality meeting which may be implemented in the system shown in FIG. 1.

FIG. 4 is a flow diagram of a method for providing a geographically distributed live mixed-reality meeting which may be implemented in the system 100 shown in FIG. 1. The MR service 106 receives a live video stream from the camera 108 at the local endpoint 102 (block 402) and generates an MR view that incorporates this live video stream from the local endpoint camera 108 (block 404). The generation of the MR view by the MR service (in block 404) comprises generation of a 3D mesh of the scene visible to the camera 108 and overlaying of any MR content (e.g. bounding areas, as described below). The MR service 106 uses motion tracking to determine the position of the camera 108 relative to the world, determines what is a horizontal or vertical surface within the environment captured in the live video stream, and estimates the light projection to give any virtually added object a realistic look.

The MR view that is generated by the MR service 106 is rendered at the local endpoint 102 on the display 212 (block 406). The rendered MR view is also transmitted (e.g. streamed) to the remote endpoints 103-104 for rendering on displays 300 at the remote endpoints by the MR meeting clients 310 at those endpoints (block 408). In various examples, the MR view that is rendered at the local endpoint 102 is captured by the MR meeting client 210 and transmitted (e.g. streamed) to the remote endpoints 103-104 for rendering on displays 212 at the remote endpoints 300 by the MR meeting clients 310 at those endpoints (in block 408).

By using this method, in which the MR view is streamed from the local endpoints to the remote endpoints rather than being independently generated at each remote endpoint, the amount of data that is transmitted to the remote endpoints is reduced (e.g. because the detailed data used to generate the 3D meshes, which may include IR data in some examples, need not be transmitted). Additionally, latency is reduced because there is no delay whilst the remote endpoints generate 3D meshes and the MR views displayed on each of the endpoints are inherently identical and synchronized (unlike if the views were independently generated at each endpoint). Furthermore, the computational effort at the remote endpoints is significantly reduced and this makes the method of FIG. 4 particularly suited to systems in which the endpoints are mobile phones or other portable devices where the computational power (and/or battery power) may be limited and where the network bandwidth (for communication between endpoints) may also be constrained compared to wired networks.

During the meeting, touch input data (or more generally, user input data) defining a bounding area (e.g. a bounding box or other bounding shape) within the MR view is received at the MR service 106 from one of the endpoints 102-104 (block 410). This user input data may be received from the local endpoint or from a remote endpoint and the user input data references 2D screen coordinates instead of real-world coordinates. The term 'real-world' is used herein to refer to the physical world and distinguish it from any virtual world. The user input data received from a remote endpoint cannot reference real-world coordinates because, as described above, the 3D mesh is only generated at the MR service 106 associated with the local endpoint and the remote endpoints do not independently generate 3D meshes of the viewed environment (and hence have no spatial understanding). The user input data may also comprise a timestamp indicating the time at which the user input data was generated. This timestamp may be used by the MR service 106 to reconstruct the position of the camera 108 when the annotation was made by the remote endpoint, as there is a high probability that with a mobile camera 108 (e.g. such as in a mobile phone), the position of the camera will have moved before the user input data is received from the remote endpoint. Latency may be introduced as a consequence of the network between the endpoints and additionally the time taken to render the image initially at the local endpoint and to render the image once received at the remote endpoint. The user input data may be communicated from the MR meeting client 310 at a remote endpoint to the MR meeting client 210 at the local endpoint and then the client 210 at the local endpoint may communicate the data to the MR service 106.

The MR service 106 generates, from the user input data, one or more real-world anchors for the bounding area (block 412). The bounding area may be a 2D shape or a 3D volume. A real-world anchor may be an absolute real-world position, e.g. in the form of a 3D coordinate, or may be a position defined relative to a real-world object, e.g. in the form of a position defined relative to the real-world position of an object (e.g. an inanimate object or a person) within the viewed scene at the local endpoint (as captured in the live video stream).

The generation of a real-world anchor for a bounding area (in block 412) may comprise identification, by the MR service 106, of a plurality of physical highlights (or markers) within the image (e.g. a frame from the live video stream at the time-stamp that corresponds to the user input data). These highlights may, for example, be sharp changes in contrast, colour or other sharp edges, etc. The relative position of these highlights (which may also be referred to as tracking points) to each other is determined by the MR service 106 and used as anchor points within the scene. In various examples, one or more tracking points (e.g. a set of tracking points) may be used to specify (or create) a single anchor point. One or more of these anchor points is then selected, based on the position of the bounding area within the scene, as a real-world anchor for a bounding area. By increasing the number of anchor points that map onto the physical highlights, the resolution of the map of the environment is improved and so the accuracy of finding (and re-finding) the same physical place within the live video stream (and hence within the environment) is improved. It will be appreciated that in other examples, different methods may be used to generate real-world anchors (e.g. a QR code in the environment may be used as a real-world anchor).

Having defined one or more real-world anchors (or in various examples, a plurality of real-world anchors) for the bounding area (in block 412), the bounding area may be included within the MR view generated by the MR service 106 at the real-world position defined by the one or more anchors (block 414) such that it is visible to users at all of the endpoints at that position. It will be appreciated that as the bounding area is anchored in the real-world, if the camera view changes (e.g. because a user moves the local endpoint and hence changes the direction in which the camera is pointing), the position of the bounding area may no longer be visible within the live video stream and hence the bounding area may not be visible within the MR view. Similarly, if the position of the bounding area is relative to an object, if that object moves, the position of the bounding area also moves. In other examples, however, the bounding area may not be shown graphically within the MR view (e.g.

where there is already a real-world indication of the bounding area (e.g. a rectangle drawn on a whiteboard within a marker).

Figure 5A:
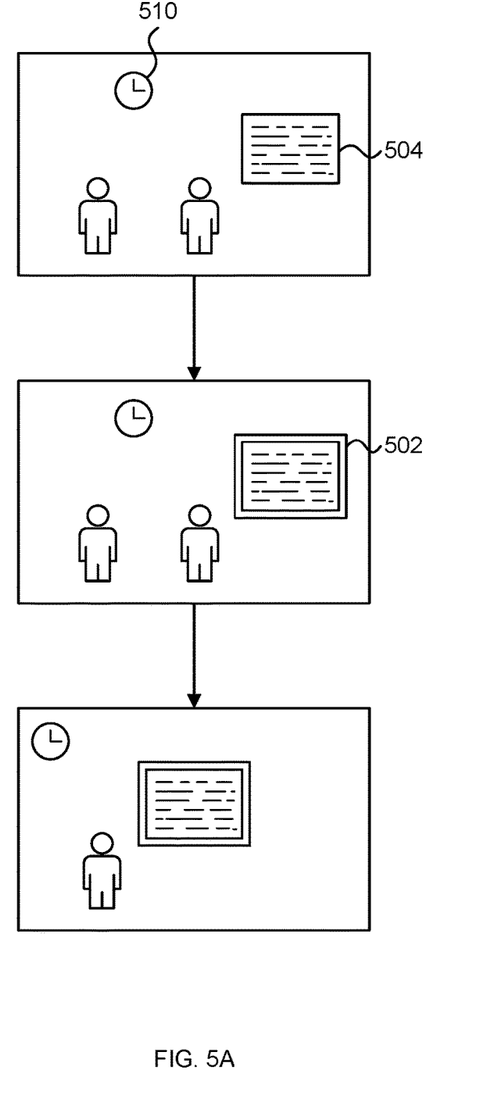
FIGS. 5A and 5B show two different graphical representations of the method of generating a bounding area within a mixed reality view.
Figure 5B:
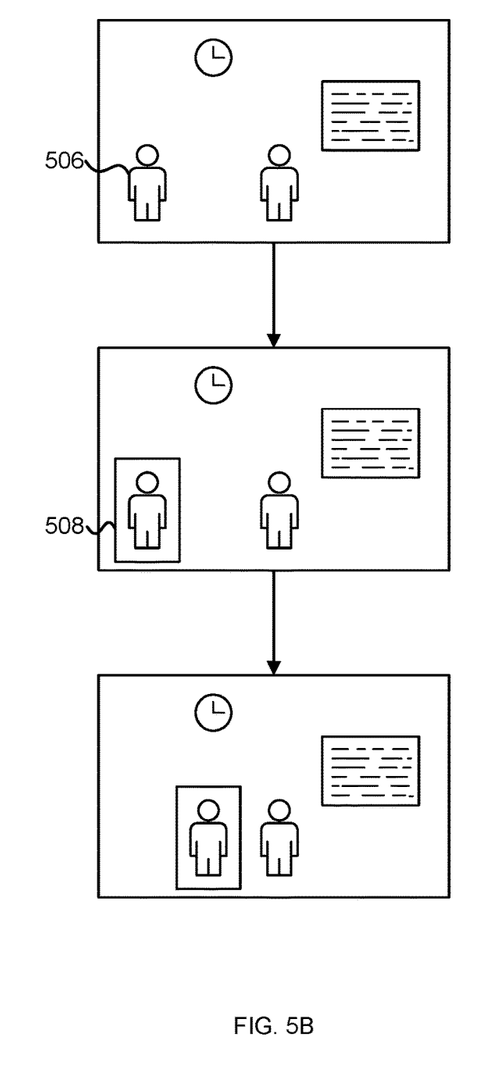

Two example bounding areas are shown in FIGS. 5A and 5B. In FIG. 5A, a user defines a bounding area by drawing a rectangle 502 onto the rendered MR view at the user's endpoint, e.g. by touching the touch-screen display 212 and tracing out a rectangle on the screen, where this rectangle 502 surrounds a white board 504 visible in the live video stream. The real-world anchor(s) for the bounding area 502 may be defined as absolute real-world coordinates or, because the rectangle surrounds an object in the scene, as coordinates relative to that object (i.e. relative to the white board 504). In this example, as the object is fixed in position, the two alternatives have the same ultimate result. If the camera view changes (as shown in the third image in FIG. 5A), then the position of the bounding area in real-world space remains the same and so continues to be shown surrounding the white board 504.

In FIG. 5B, in contrast to FIG. 5A, the bounding area is drawn by a user around a person 506 within the live video stream. Again, the real-world anchor(s) for the bounding area 508 may be defined as absolute real-world coordinates or, because the rectangle surrounds an object (e.g. a person) in the scene, as coordinates relative to that object. In this example, as the object is not fixed in position, the two alternatives do not have the same ultimate result. In the example shown in FIG. 5B, the bounding area is defined relative to the position of the person and so when the person moves (as shown in the third image in FIG. 5B), then the position of the bounding area in real-world space relative to the person remains the same but the absolute position of the bounding area in real-world space changes and this may be implemented using computer vision techniques that track the motion of the person within the live video stream (e.g. by looking for moving parts of the picture relative to a static background, checking for moving edges on the body, such as by looking for changes of contrast, or using machine learning). The identity of the person 506 may be determined automatically by the MR service 106 or MR meeting client 210 or may be manually tagged by one of the meeting participants (e.g. a user at the local endpoint 102) and this identity may be used in determining how the bounding area is used to control content distribution, as described in more detail below.

Depending upon the way a bounding area is defined, it may have one or more real-world anchors. For example, where the bounding area is a 3D volume, it may have a plurality of real-world anchors defining a plurality of the corners of the volume, or a single real-world anchor defining the center of the volume or one of the corners.

The MR meeting clients 210, 310 are configured to enable users to place content objects (e.g. documents, spreadsheets, presentations, or parts thereof) into the MR view and dependent upon where these content objects are placed relative to the bounding area, different rules for content processing (e.g. content distribution and/or modification) are applied by the MR meeting client 210 at the local endpoint (block 416) and used to process the content (block 418). In various examples, the content processing rules may be content distribution rules and these content distribution rules that are applied may define access permissions for the piece of content represented by the content object (e.g. whether a piece of content can be read or not, whether it can be edited or not, whether access to the content persists after the end of the meeting or is only permitted during the meeting, etc.) and/or may define actions to be performed (e.g. emailing the content to meeting participants or a pre-defined set of users, printing the content on a printer close to each endpoint, etc.). In various examples, the content processing rules may (in addition or instead) be content modification or manipulation rules and may, for example, modify the content by changing its shape, colour, size, form, etc. In various examples, the content processing rules may comprise an automated workflow and/or may be provided by a rule service (e.g. Microsoft® Flow or IFTTT).

Although the processing of the content (in block 418) is described above as being implemented by the MR meeting client 210 at the local endpoint, in various examples, the content processing may be distributed, such that it is implemented at the endpoint where the content was added to the MR view. Where a content object is added at a remote endpoint, the content processing (e.g. distribution or modification) may be implemented by the MR meeting client 310 at that remote endpoint in response to a trigger message sent by the MR meeting client 210 at the local endpoint and received at the MR meeting client 310 at the particular remote endpoint.

As with the bounding area, the user inputs that define both the content object and the position at which the content object is placed in screen coordinates are transmitted to the MR service 106. The MR service 106 receives the data (block 420) and converts the screen coordinates to real-world positions within the rendered scene (block 422) in a similar manner to the conversion of the bounding area screen coordinates. A content processing rule set is then selected and applied to the content object based on the relative positions of the bounding area and the content object in real-world coordinates (block 424).

The selection of a content processing rule set (in block 424) may comprise determining whether the real-world position of the content object is inside or outside the bounding area, where as described above, the bounding area may be a 2D shape or a 3D volume. If the content object is placed inside the bounding area, a first rule set is applied (e.g. the content is marked as read only for participants at the meeting) and if the content object is placed outside the bounding area, a second rule set is applied for processing of the content (e.g. the content is marked as editable by participants at the meeting). Referring back to the example shown in FIG. 5B, if the content object is placed inside the bounding area 508 (e.g. a bounding area that surrounds and is anchored to the location of a person in the real-world), the rule set that is applied may result in the piece of content being emailed (or otherwise made available) to the person inside the bounding area and if the content object is placed outside the bounding area, the piece of content may be emailed (or otherwise made available) to all the participants at the meeting. As described above the identity of the person may be automatically determined by the MR meeting client 210 or may be manually entered by a user at one of the endpoints (e.g. the local endpoint 102). The identity may be an actual person (e.g. Mr. J. Smith) or a role identifier (e.g. meeting leader).

The content processing rule sets which are applied to bounding areas and to content objects dependent upon their real-world position relative to the bounding areas may be selected from a set of persistent content processing rule sets which may persist between MR meetings and may be selected manually (e.g. by the user that defines the bounding area) or automatically (e.g. by the MR meeting client 210). For example, where the bounding area relates to a person, a rule that emails (or otherwise provides) the piece of content to the particular person may be automatically applied to the bounding area. In another example, a default rule set (or pair of rule sets, one for inside the bounding area and one for outside the bounding area) may be automatically applied and then may, in various examples, be subsequently modified by a meeting participant. Alternatively, the rule sets may be defined by the user generating the bounding area and this rule defining data may, for example, be transmitted to the local endpoint as part of the user input data in block 410. In such examples, the rule sets may be meeting specific and hence not persist between meeting sessions. In other examples, the rule sets may only be defined by the user at the local endpoint. In various examples different content processing rule sets (e.g. content distribution rule sets and/or content modification rule sets) may be available (or used) dependent upon a geolocation context of the meeting or of an endpoint (e.g. whether the endpoint is in the work environment, at home or in a public space) or based on the presence (or absence) of a particular meeting participant or a meeting participant with a particular predefined role (e.g. only teachers or a mix of teachers and students in an education context).

In the methods described above, the bounding area is defined by a user input on a touch-screen display (as received by the MR service 106 in block 420). In various examples, however, a bounding area may also be defined in real-world space by a user at the local endpoint 102. In such examples, a user may draw a bounding area on a white board or other writing surface which is visible in the live video stream and hence the data defining the bounding area that is received by the MR service is not user input data (as in block 410 of FIG. 4) but within the live video stream (received in block 402 of FIG. 4). The method of FIG. 4 as described above may therefore be modified to include an additional operation of analyzing the live video stream to identify bounding areas (block 426). This may, for example comprise identifying any planar surfaces in the 3D environment (which, as described above, is already performed in order to generate anchor points and project virtual objects correctly onto the surface) and then identifying any changes to markings on the planar surface, e.g. identifying any new lines that surround an area. The analysis of the live video stream (in block 426) may be in addition to, or instead of, receiving the user input data defining a bounding area (block 410). If block 410 is omitted, then users who are at remote ends cannot define bounding areas and therefore inclusion of this operation (of block 410) enables all meeting participants to define bounding areas and hence sets of content processing rules.

In further examples, the analysis of the live video stream to identify bounding areas may, in addition to (or instead of) identifying bounding areas drawn in the real-world by a user at the local endpoint, automatically define bounding areas based on objects within the live video stream. For example, referring back to the examples shown in FIGS. 5A and 5B, there is a clock 510 visible in the MR view. The MR service 106 may, for example, as part of the analysis of the live video stream (in block 426), identify one or more objects in the scene (e.g. clock 510) and define bounding areas associated with these objects. These bounding areas may be included within the MR view and used to apply content processing rule sets in a similar manner to the user-drawn bounding areas described above. Use of this automatic definition of bounding areas enables a set of content processing rules to be applied in multiple meetings associated with a common object without requiring user implementation each time.

In another example, referring back to the example shown in FIG. 5B, the MR service 106 may automatically define bounding areas associated with each person visible in the live video stream. The identity of each person may also be automatically identified (e.g. using information about meeting participants which may be available to the MR meeting client 210) or may require manual tagging by a meeting participant. In such an example, by automatically defining bounding areas for each person visible in the live video stream and identifying each person (manually or automatically), the MR meeting client 210 may assign a content processing rule to each bounding area that triggers the emailing of pieces of content to the corresponding person whenever a content object is placed inside the respective bounding area. This may, for example, provide visually-impaired users with an easy way to share content because they can use audible clues as well as the visual MR view to identify the position of bounding areas and hence drag content items to share content with particular meeting participants.

Figure 6:
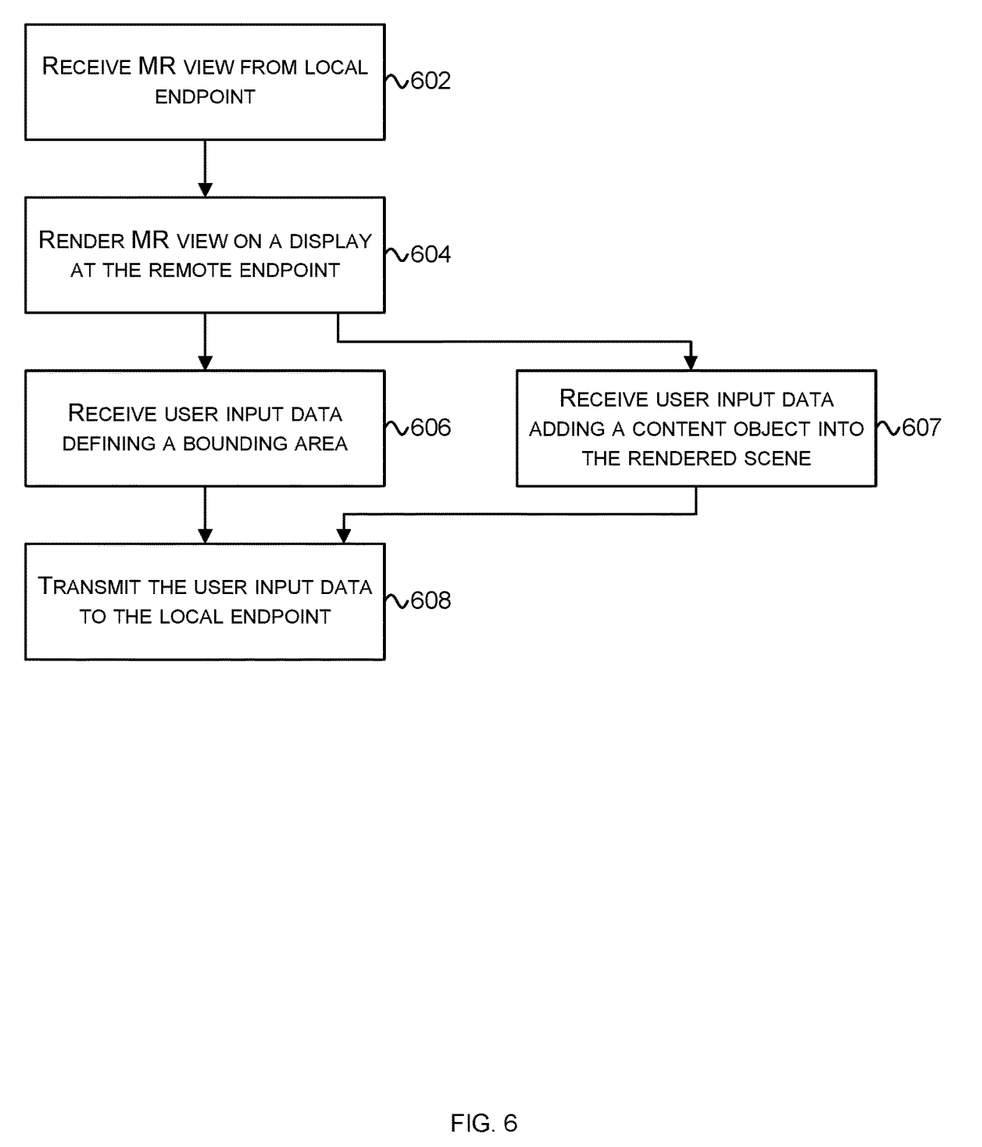
FIG. 6 is a flow diagram which shows an example method of operation of the mixed-reality meeting client at a remote endpoint.

FIG. 6 is a flow diagram which shows an example method of operation of the MR meeting client 310 at a remote endpoint. As described above, this client 310 is lightweight and does not perform significant processing and this means that it is suitable for running on computing devices which are constrained in terms of computing power and/or battery. As shown in FIG. 6, the MR meeting client 310 at a remote endpoint, receives the MR view from the MR meeting client 210 at the local endpoint or from the MR service 106 directly (block 602) and renders the MR view on a display 212 at the remote endpoint 300 (block 604). In response to receiving user data defining a bounding area (block 606) or user data adding a content object into the rendered scene (block 607), the user input data is transmitted to the MR meeting client 210 at the local endpoint (block 608).

The methods described herein enable all participants in the mixed-reality live meeting to define content distribution rules and share content easily. Through the use of multiple bounding areas, multiple sets of rules can be applied within the same meeting space.

In the examples described above, only a single bounding area is shown; however, it will be appreciated that several bounding areas may be defined and may be visible in any MR view. Where several bounding areas are defined, different rule sets may be defined for each bounding area and further rule sets may be defined for areas in real-world space where two or more bounding areas intersect.

In the examples described above, each of the endpoints have the same bounding area (e.g. the same bounding area is shown in the MR view at each endpoint, where the bounding area is rendered within the MR view). In various examples, however, different bounding areas may be generated by and applied to different endpoints or different groups of endpoints. For example, there may be one or more bounding areas, and hence sets of content processing rules, which apply to content objects placed by the local endpoint and there may be one or more different bounding areas, and hence content processing rules, which apply to content objects placed into the MR view by remote endpoints, or there may be different bounding areas (and hence different content processing rules) for each of the endpoints participating in a MR meeting. This, for example, enables different content distribution rules to be applied to content objects placed into the MR view by different users. To implement this, the MR service 106 may generate multiple MR views, one for each group of endpoints (e.g. a first MR view for the local endpoint and a second MR view for the remote endpoints). This use of different bounding areas for different endpoints may, for example, be used to enable each participant to independently control the processing applied to content objects that they place into the MR view (e.g. to control the content distribution of those content objects).

In the methods described above, the 3D mesh is only generated within the MR service 106 associated with the local endpoint and there is no separate generation of 3D meshes at the remote endpoints. In a variation on the methods described above, 3D meshes may additionally be generated at the remote endpoints but these may be less detailed than the 3D mesh generated at the local endpoint to reduce the amount of data that is sent from the local endpoint to the remote endpoints to assist with mesh generation. The generation of 3D meshes at the remote endpoints (in addition to the local endpoint) may, in various examples, result in a reduction in the latency associated with adding content objects into the MR view. Additionally, the 3D mesh may only be generated at a subset of the remote endpoints.

As described above, by using the method of FIG. 4, the system 100 operates more efficiently and effectively. By eliminating any spatial processing performed at the remote endpoints and instead generating the MR view at the local endpoint only, the latency is reduced and the synchronization between endpoints is improved. Furthermore, the methods have a technical effect on a process which is carried on outside the local endpoint because content distribution is performed (in block 418).

Referring back to FIGS. 2A-2D and 3, the endpoints 102A-102D, 300 are computing devices that comprise one or more processors 208 which may be microprocessors, controllers or any other suitable type of processors for processing computer executable instructions to control the operation of the device in order to implement the methods described herein (e.g. to render the MR view on a local display and to receive user input data). In some examples, for example where a system on a chip architecture is used, the processors 208 include one or more fixed function blocks (also referred to as accelerators) which implement a part of the method of rendering the MR view (or other part of the operating method of the endpoint) in hardware (rather than software or firmware). Platform software comprising an operating system or any other suitable platform software may be provided at the endpoint to enable application software (e.g. the MR meeting client 210, 310 and optionally the MR service 106) to be executed on the endpoint.

Whilst the MR service 106 and MR meeting clients 210, 310 are described as being implemented in software, alternatively, or in addition, the functionality described herein may be performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

As shown in FIGS. 2A-D and 3, the computer executable instructions are provided using any computer-readable media that is accessible by the endpoint 102A-102D, 300. Computer-readable media includes, for example, computer storage media such as memory 206 and communications media. Computer storage media, such as memory 206, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 206) is shown within the endpoints it will be appreciated that the storage is, in some examples, distributed or located remotely and accessed via a network or other communication link (e.g. using communication interface 202).

The endpoints 102A-D, 300 also comprises an input/output (I/O) controller 204 arranged to output display information to a touch-screen display device 212 which may be separate from or integral to the endpoints 102A-D, 300. The display information may provide a graphical user interface. The input/output controller 204 is also arranged to receive and process user input from the touch-screen display device 212 and in various examples, one or more other devices, such as a user input device (e.g. a mouse, keyboard, camera, microphone or other sensor). In some examples the user input device detects voice input, user gestures or other user actions and provides a natural user interface (NUI). This user input may be used to select or set content processing rules (as described above).

Any of the input/output controller 204, display device 212 and any additional user input device may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive mixed reality and virtual reality systems and technologies for sensing brain activity using electric field sensing electrodes (electro encephalogram (EEG) and related methods).

Although the present examples are described and illustrated herein as being implemented in a system comprising one local endpoint and two remote endpoints, the system described is provided as an example and not a limitation. As those skilled in the art will appreciate, the present examples are suitable for application in a variety of different types of systems with different numbers of remote endpoints (e.g. only one remote endpoint or more than two remote endpoints).

A first further example provides a method of providing a geographically distributed live mixed-reality meeting, the method comprising: Receiving, from a camera at a first endpoint, a live video stream; Generating, at a mixed reality service, a mixed reality view incorporating the received video stream; Rendering the mixed reality view at a display at the first endpoint and transmitting the mixed reality view to at least one other geographically distant endpoint; Receiving, at the mixed reality service, data defining a bounding area; Calculating, by the mixed reality service, a real world anchor for the bounding area using the data defining the bounding area; and Inserting the bounding area in the mixed reality view at a real world position determined using the real world anchor, wherein the bounding area triggers application of different content processing rule sets to content objects placed into the mixed reality view by users dependent upon the position of the content objects relative to the bounding area in real world space.

A second further example provides a method of providing a geographically distributed live mixed-reality meeting, the method comprising: Receiving, from a camera at a first endpoint, a live video stream; Generating, at a mixed reality service, a mixed reality view incorporating the received video stream; Transmitting the mixed reality view to a display at the first endpoint for rendering on the display and transmitting the mixed reality view to at least one other geographically distant endpoint; Receiving, at the mixed reality service, data defining a bounding area; Calculating, by the mixed reality service, a real world anchor for the bounding area using the data defining the bounding area; and Inserting the bounding area in the mixed reality view at a real world position determined using the real world anchor, wherein the bounding area triggers application of different content processing rule sets to content objects placed into the mixed reality view by users dependent upon the position of the content objects relative to the bounding area in real world space.

The method according to the first or second further example may further comprise: Applying different content processing rule sets to content objects placed into the mixed reality view by users dependent upon the position of the content objects relative to the bounding area in real world space.

A third further example provides a method of providing a geographically distributed live mixed-reality meeting, the method comprising: Receiving, from a camera at a first endpoint, a live video stream; Generating, at a mixed reality service, a mixed reality view incorporating the received video stream; Rendering the mixed reality view at a display at the first endpoint and transmitting the mixed reality view to at least one other geographically distant endpoint; Receiving, at the mixed reality service, data defining a bounding are; Calculating, by the mixed reality service, a real world anchor for the bounding area using the data defining the bounding area; Rendering the bounding area in the mixed reality view at a real world position determined using the real world anchor; and Applying different content processing rule sets to content objects placed into the mixed reality view by users dependent upon the position of the content objects relative to the bounding area in real world space.

A fourth further example provides a method of providing a geographically distributed live mixed-reality meeting, the method comprising: Receiving, from a camera at a first endpoint, a live video stream; Generating, at a mixed reality service, a mixed reality view incorporating the received video stream; Rendering the mixed reality view at a display at the first endpoint and transmitting the mixed reality view to at least one other geographically distant endpoint; Receiving, at the mixed reality service, data defining a bounding area; Calculating, by the mixed reality service, a real world anchor for the bounding area using the data defining the bounding area; Inserting the bounding area in the mixed reality view at a real world position determined using the real world anchor; and Applying different content processing rule sets to content objects placed into the mixed reality view by users dependent upon the position of the content objects relative to the bounding area in real world space.

In any of the first to fourth further examples, applying different content processing rule sets to content objects placed into the mixed reality view by users dependent upon the position of the content objects relative to the bounding area in real world space may comprise: Applying a first content processing rule to content objects placed within the bounding area in real world space; and Applying a second content processing rule to content objects placed outside the bounding area in real world space.

In any of the first to fourth further examples, the method may further comprise: Distributing pieces of content corresponding to the content objects according to the rule set applied to each content object.

In any of the first to fourth further examples, applying different content processing rule sets to content objects placed into the mixed reality view by users dependent upon the position of the content objects relative to the bounding area in real world space may comprise: Receiving, at the mixed reality service, user input data defining a content object and a screen coordinate, the user input data being received from one of the end points; Calculating, by the mixed reality service, a real world position for the content object; and Selecting a content processing rule set using the relative real world positions of the bounding area and the content object.

In any of the first to fourth further examples, receiving, at the mixed reality service, defining a bounding area may comprise: Receiving, at the mixed reality service, user input data defining a bounding area, the user input data being received from one of the endpoints.

In any of the first to fourth further examples, the user input data defining a bounding area may comprise: User input data defining a position of the bounding area in screen coordinates, and optionally a rule set to be applied to content objects placed within the bounding area in the mixed reality view.

In any of the first to fourth further examples, receiving, at the mixed reality service, defining a bounding area may comprise: Analyzing, at the mixed reality service, the live video stream to identify one or more bounding areas.

In any of the first to fourth further examples, the one or more bounding areas may be identified based on objects in the live video stream and/or user-drawn features in the live video stream.

In any of the first to fourth further examples, the different content processing rule sets may comprise different content distribution rule sets.

In any of the first to fourth further examples, transmitting the mixed reality view to at least one other geographically distant end point may comprise: Capturing, by a mixed reality meeting client at the first endpoint, the rendered mixed reality view and transmitting the captured mixed reality view to at least one other geographically distant end point.

In any of the first to fourth further examples, the real world anchor for the bounding area may comprise a real world absolute position for the bounding area.

In any of the first to fourth further examples, calculating, by the mixed reality service, a real world anchor for the bounding area using the data defining the bounding area may comprise: determining whether the data defining the bounding area describes a bounding area that surrounds an object visible in the live video stream; and in response to determining that the bounding area surrounds an object visible in the live video stream, setting the real world anchor for the bounding area to be a position relative to the object in the real world.

In any of the first to fourth further examples, the object in the real world may comprise a person.

A fifth further example comprises a system arranged to provide a geographically distributed live mixed-reality meeting, the system comprising: an mixed reality service arranged: to receive, from a camera at a first endpoint, a live video stream, to generate an mixed reality view incorporating the received live video stream, to output the mixed reality view for rendering on the display of the first endpoint and a display of at least one other geographically distant endpoint, in response to receiving data defining a bounding area, to calculate a real world anchor for the bounding area using the received data and insert the bounding area in the mixed reality view at a real world position determined using the real world anchor, wherein the bounding area triggers application of different content processing rule sets to content objects placed into the mixed reality view by users dependent upon the position of the content objects relative to the bounding area in real world space.

The system of the fifth further example may further comprise the first endpoint, wherein the first endpoint comprises: the camera; display; and a mixed reality meeting client.

A sixth further example provides a system arranged to provide a geographically distributed live mixed-reality meeting, the system comprising: a local endpoint comprising a camera, a display and a mixed-reality meeting client; and a mixed reality service arranged: to receive, from the camera, a live video stream, to generate an mixed reality view incorporating the received live video stream, to output the mixed reality view for rendering on the display of the local endpoint and a display of at least one remote endpoint, in response to receiving data defining a bounding area, to calculate a real world anchor for the bounding area using the received data and insert the bounding area in the mixed reality view at a real world position determined using the real world anchor, wherein the mixed-reality meeting client is arranged to apply different rule sets of content objects placed into the mixed reality view by users dependent upon the position of the content objects relative to the bounding area in real world space.

In any of the fifth or sixth further examples, the mixed reality meeting client or the mixed reality service may be arranged to apply the different content processing rule sets to content objects placed into the mixed reality view by users dependent upon the position of the content objects relative to the bounding area in real world space.

In any of the fifth or sixth further examples, the first endpoint may comprise the mixed reality service.

In any of the fifth or sixth further examples, the system may further comprise a server separate from the first endpoint and wherein the mixed reality service runs on the server.

In any of the fifth or sixth further examples, the system may further comprise a plurality of geographically distant endpoints and wherein the mixed reality service is arranged to generate a 3D mesh of a viewed scene using the live video stream and the geographically distant endpoints do not generate a 3D mesh of the viewed scene.

A seventh further example provides a system arranged to provide a geographically distributed live mixed-reality meeting, the system comprising: a remote endpoint comprising a display and a mixed-reality meeting client, wherein the mixed-reality meeting client is arranged: to receive, from a local endpoint, an mixed reality view captured at the local endpoint and incorporating a live video stream also captured at the local endpoint, to render the mixed reality view on the display of the remote endpoint, in response to receiving user input data defining a bounding area, to transmit the data to the local endpoint for incorporation into the mixed reality view, and in response to receiving user input data adding a content object into the rendered mixed reality view, to transmit the data to the local endpoint and trigger processing of a piece of content associated with the content object according to a rule set determined using relative real world positions of the content object and the bounding area.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A method of providing a geographically distributed live mixed-reality meeting, the method comprising:
   receiving, from a camera at a first endpoint, a live video stream;
   generating, at a mixed reality service, a mixed reality view incorporating the received video stream;
   rendering the mixed reality view at a display at the first endpoint and transmitting the mixed reality view to at least one other geographically distant endpoint;
   receiving, at the mixed reality service, user input from the first end point or the at least one other geographically distant endpoint, the user input defining a bounding area;
   calculating, by the mixed reality service, a physical world anchor for the bounding area using the user input, the physical world anchor anchoring the bounding area in a fixed position to an object in the physical world and within the bounding area based on a set of coordinates that defines the bounding around the object in the physical world; and
   inserting the bounding area in the mixed reality view at a physical world position determined using the physical world anchor, wherein the bounding area triggers application of different content processing rule sets to content objects placed into the mixed reality view by users dependent upon the position of the content objects relative to the bounding area in physical world space.

2. The method according to claim 1, further comprising:
   applying different content processing rule sets to content objects placed into the mixed reality view by users dependent upon the position of the content objects relative to the bounding area in physical world space.

3. The method according to claim 2, wherein applying different content processing rule sets to content objects placed into the mixed reality view by users dependent upon the position of the content objects relative to the bounding area in physical world space comprises:
   applying a first content processing rule to content objects placed within the bounding area in physical world space; and
   applying a second content processing rule to content objects placed outside the bounding area in physical world space.

4. The method according to claim 2, further comprising:
   distributing pieces of content corresponding to the content objects according to the rule set applied to each content object.

5. The method according to claim 2, wherein applying different content processing rule sets to content objects placed into the mixed reality view by users dependent upon the position of the content objects relative to the bounding area in physical world space comprises:
   receiving, at the mixed reality service, user input data defining a content object and a screen coordinate; and
   selecting a content processing rule set using relative physical world positions of the bounding area and the content object.

6. The method according to claim 1, wherein the user input includes two-dimensional coordinates.

7. The method according to claim 6, wherein the user input comprises:
   user input data defining a position of the bounding area in screen coordinates, and optionally a rule set to be applied to content objects placed within the bounding area in the mixed reality view.

8. The method according to claim 1, wherein receiving, at the mixed reality service, defining a bounding area comprises:
   analyzing, at the mixed reality service, the live video stream to identify one or more bounding areas.

9. The method according to claim 8, wherein one or more bounding areas.

10. The method according to claim 1, wherein the physical world is not a virtual world.

11. The method according to claim 1, wherein transmitting the mixed reality view to at least one other geographically distant end point comprises:
   capturing, by a mixed reality meeting client at the first endpoint, the rendered mixed reality view and transmitting the captured mixed reality view to at least one other geographically distant end point.

12. The method according to claim 1, wherein the physical world anchor for the bounding area comprises a physical world absolute position for the bounding area.

13. The method according to claim 1, wherein calculating, by the mixed reality service, a physical world anchor for the bounding area using data defining the bounding area comprises:
   determining whether the user input describes a bounding area that surrounds an object visible in the live video stream; and
   in response to determining that the bounding area surrounds an object visible in the live video stream, setting the physical world anchor for the bounding area to be a position relative to the object in the physical world.

14. A system arranged to provide a geographically distributed live mixed-reality meeting, the system comprising:
   an mixed reality service arranged:
      to receive, from a camera at a first endpoint, a live video stream,
      to generate a mixed reality view incorporating the received live video stream,
      to output the mixed reality view for rendering on the display of the first endpoint and a display of at least one other geographically distant endpoint,
      in response to receiving, from the first end point, user input defining a bounding area or the at least one other geographically distant endpoint, to calculate a physical world anchor for the bounding area using the received user input and insert the bounding area in the mixed reality view at a physical world position determined using the physical world anchor, the physical world anchor comprising a set of coordinates that defines the bounding in a fixed position around an object in the physical world,
   wherein the bounding area triggers application of different content processing rule sets to content objects placed into the mixed reality view by users dependent upon the position of the content objects relative to the bounding area in physical world space.

15. The system according to claim 14, further comprising the first endpoint, wherein the first endpoint comprises:
   the camera;
   display; and
   a mixed reality meeting client.

16. The system according to claim 15, wherein the mixed reality meeting client or the mixed reality service is arranged to apply the different content processing rule sets to content objects placed into the mixed reality view by users dependent upon the position of the content objects relative to the bounding area in physical world space.

17. The system according to claim 15, wherein the first endpoint comprises the mixed reality service.

18. The system according to claim 17, further comprising a server separate from the first endpoint and wherein the mixed reality service runs on the server.

19. The system according to claim 15, further comprising a plurality of geographically distant endpoints and wherein the mixed reality service is arranged to generate a 3D mesh of a viewed scene using the live video stream and the geographically distant endpoints do not generate a 3D mesh of the viewed scene.

20. One or more computer storage media comprising computer-executable instructions that, when executed by one or more processors, cause the one or more processors to perform the following operations:
   receiving a live video stream;
   generating a mixed reality view incorporating the received video stream;
   rendering the mixed reality view at a display at the first endpoint and transmitting the mixed reality view to at least one other geographically distant endpoint;
   receiving user input from the first end point or the at least one other geographically distant endpoint, the user input defining a bounding area;
   calculating a physical world anchor for the bounding area using the user input, the physical world anchor anchoring the bounding area in a fixed position to an object in the physical world and within the bounding area based on a set of coordinates that defines the bounding around object; and
   inserting the bounding area in the mixed reality view at a physical world position determined using the physical world anchor, wherein the bounding area triggers application of different content processing rule sets to content objects placed into the mixed reality view by users dependent upon the position of the content objects relative to the bounding area in physical world space.

* * * * *